C. E. VERHUNCE.
FLEXIBLE GAS TUBING.
APPLICATION FILED NOV. 11, 1918.
1,361,206.
Patented Dec. 7, 1920.
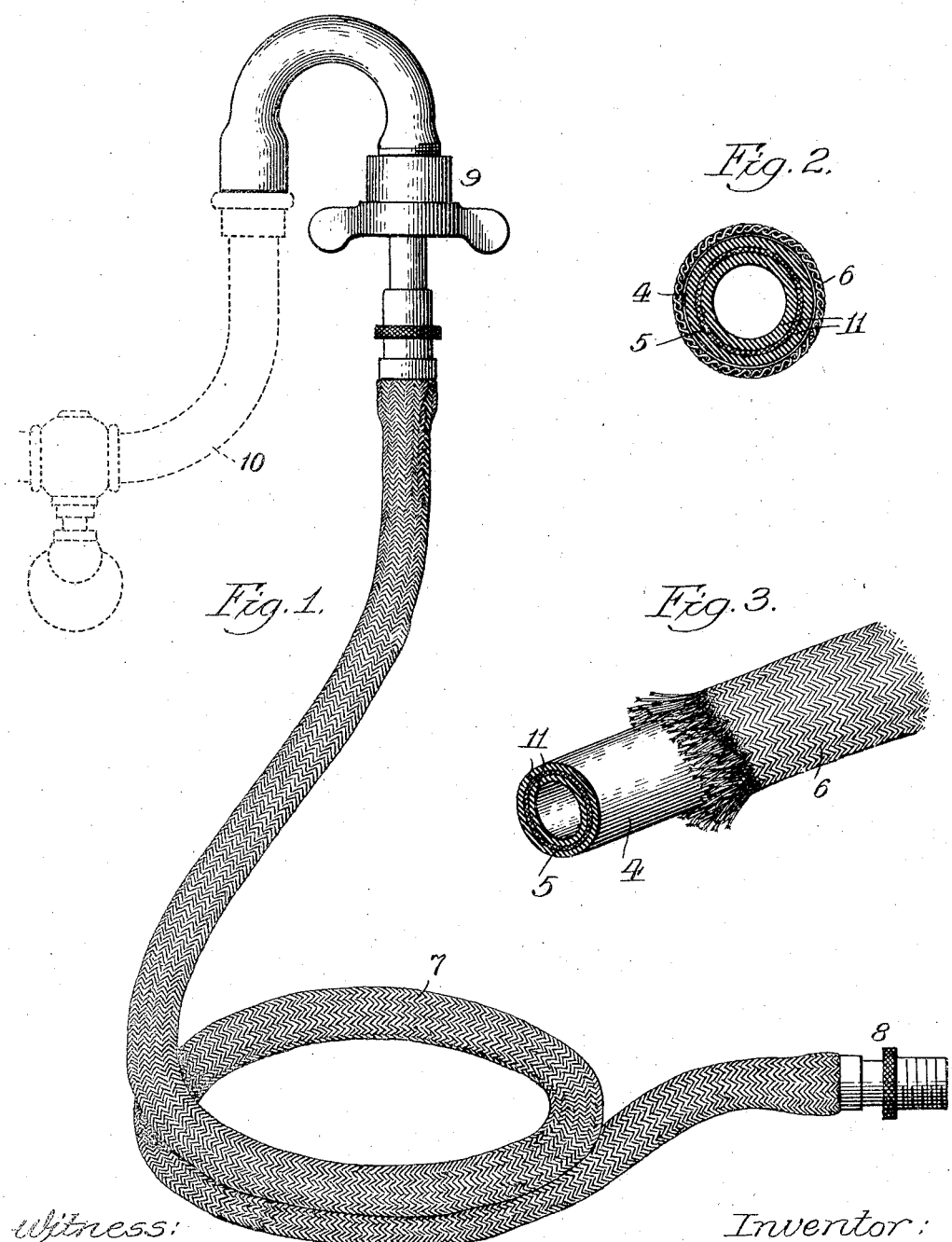

UNITED STATES PATENT OFFICE.

CHARLES E. VERHUNCE, OF CHICAGO, ILLINOIS, ASSIGNOR TO R. WILLIAMSON & CO., OF CHICAGO, ILLINOIS, A CORPORATION OF ILLINOIS.

FLEXIBLE GAS-TUBING.

1,361,206.  Specification of Letters Patent.  Patented Dec. 7, 1920.

Application filed November 11, 1918. Serial No. 261,958.

*To all whom it may concern:*

Be it known that I, CHARLES E. VERHUNCE, a citizen of the United States, and a resident of Chicago, in the county of Cook and State of Illinois, have invented certain new and useful Improvements in Flexible Gas-Tubing, of which the following is a full, clear, and exact description.

The invention relates to flexible gas tubing.

It has heretofore been the common practice to cover rubber tubing with braided material or fabric and cement or otherwise secure, by a solution, the fabric on the outside of the rubber tubing to provide a gas-tight covering and against leakage through the rubber. In practice, it has been found that the frequent bending of the tube causes disintegration of the cement or solution and then leakage results.

The object of the present invention is to provide an improved flexible tubing in which this objection is overcome.

The invention consists in the several novel features hereinafter set forth and more particularly defined by claim at the conclusion hereof.

In the drawing: Figure 1 is a perspective of a flexible tube and connection embodying the invention. Fig. 2 is a cross section of the tube on an enlarged scale. Fig. 3 is a sectional perspective of the improved tube.

The invention comprises a rubber tube 4 in which there is centrally embedded a tubular fabric 5, so it will be completely covered with rubber, as at 11, both on the inside and outside thereof, the fabric being vulcanized in the rubber tubing so that fabric, in and of itself, will provie against leakage of gas through the rubber. A covering 6 is braided rather loosely around the rubber tubing 4 to give it the appearance of a braided or fabric tubing and to protect the rubber. This braided fabric 6 is formed independently of the rubber tube 4, so that flexure of the tubing does not tend to cause any disintegration in the covering, such as results when the covering is cemented or fixedly secured to the tube. As a result of forming the tube with a tubular fabric 5, with rubber on the outside and inside thereof and covering the outside of the rubber tubing with a comparatively loose independent or unsecured braided fabric, the tubing will be durable against leakage and still have the protection of the covering.

In Fig. 1, there is a section of tubing 7 constructed as shown in Figs. 2 and 3 and provided at one end with a suitable coupling 8 for attachment to a gas lamp or utensil and at its other end with a suitable coupling 9, which is adapted to be connected to a fixture 10.

The invention is not to be understood as restricted to the details set forth, since these may be modified within the scope of the appended claim, without departing from the spirit and scope of the invention.

Having thus described the invention, what I claim as new and desire to secure by Letters Patent, is:

Gas tubing formed of tubular fabric having its inside and outside covered with rubber and a braided covering fitting loosely around the outside and independent of the rubber covering and permitting free flexure of the rubber.

CHAS. E. VERHUNCE.